United States Patent
Inomata et al.

(10) Patent No.: US 7,352,335 B2
(45) Date of Patent: Apr. 1, 2008

(54) RADAR APPARATUS HAVING ARRAYED HORN ANTENNA PARTS COMMUNICATED WITH WAVEGUIDE

(75) Inventors: Naofumi Inomata, Kawasaki (JP); Takahisa Ishida, Utsunomiya (JP); Masahito Shingyoji, Sakado (JP); Hiroyuki Ando, Kawagoe (JP)

(73) Assignees: Honda Elesys Co., Ltd., Yokohama (JP); Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/605,255

(22) Filed: Nov. 29, 2006

(65) Prior Publication Data
US 2007/0139287 A1   Jun. 21, 2007

(30) Foreign Application Priority Data
Dec. 20, 2005   (JP)   ............................. 2005-366547

(51) Int. Cl.
*H01Q 13/00*   (2006.01)
(52) U.S. Cl. ...................................... 343/786; 343/713
(58) Field of Classification Search ................ 343/713, 343/771, 786
See application file for complete search history.

(56) References Cited
U.S. PATENT DOCUMENTS

| | | | |
|---|---|---|---|
| 5,323,169 A * | 6/1994 | Koslover | 343/786 |
| 5,426,442 A * | 6/1995 | Haas | 343/778 |
| 6,211,837 B1 * | 4/2001 | Crouch et al. | 343/786 |
| 6,211,838 B1 * | 4/2001 | Cherrette et al. | 343/786 |
| 6,841,768 B2 * | 1/2005 | Moon et al. | 250/208.1 |
| 6,950,073 B2 * | 9/2005 | Clymer et al. | 343/713 |

FOREIGN PATENT DOCUMENTS

JP   2005-020525 A   1/2005

* cited by examiner

*Primary Examiner*—Tan Ho
(74) *Attorney, Agent, or Firm*—Arent Fox LLP.

(57) ABSTRACT

A horn antenna part of a radar apparatus is made of a heat emitting material and includes: an antenna body part having a plurality of horn parts arranged in an array form, wherein each horn part is open toward a front surface of the apparatus, and has a diameter which gradually increases toward the front surface; and a feeder part including a waveguide which communicates with the horn parts, wherein the feeder part is connected to the antenna body part. The radar apparatus also includes: a wireless part for generating a high-frequency signal supplied to the feeder part, and converting a reflected high-frequency signal to a medium-frequency signal; and a circuit part for controlling the high-frequency signal and processing the medium-frequency signal. At least one of the wireless part and the circuit part is arranged in a manner such that it contacts the feeder part.

8 Claims, 3 Drawing Sheets

RADAR APPARATUS HAVING ARRAYED HORN ANTENNA PARTS COMMUNICATED WITH WAVEGUIDE

BACKGROUND OF THE INVENTION

1. Field of the Invention

The present invention relates to a radar apparatus installed in a vehicle or the like.

Priority is claimed on Japanese Patent Application No. 2005-366547, filed Dec. 20, 2005, the content of which is incorporated herein by reference.

2. Description of the Related Art

Generally, a radar apparatus has: an antenna part for transmitting radio waves to space, and receiving reflected waves from space; a wireless part for generating a high-frequency signal supplied to the antenna part, and converting a reflected high-frequency signal to a medium-frequency signal; and a circuit part for controlling the high-frequency signal and processing the medium-frequency signal.

In such a radar apparatus, electric power consumption of the wireless part is large, and heat is generated when the wireless part operates; thus, the heat generated at the wireless part should be dissipated. Generally, the wireless part is connected to an antenna, a body of the apparatus, a heat sink, or the like, so as to dissipate the heat.

When the above-described radar apparatus is installed in a vehicle such as an automobile or the like, the apparatus should be miniaturized so as to improve conditions or convenience for the installation. Therefore, a radar apparatus has been proposed which has the antenna part employing a planar antenna (see, for example, Japanese Unexamined Patent Application, First Publication No. 2005-20525).

In such a radar apparatus, the thickness of the planar antenna itself can be reduced, so that the depth of the radar apparatus can be reduced so as to miniaturize the apparatus.

With respect to the heat removal, the planar antenna is prepared as a slot antenna using metal parts, in which side walls of its waveguide are used as fins, and the planar antenna, the wireless part, and the circuit part are positioned in an integral contact manner. Therefore, heat generated at the wireless part and the circuit part can be transmitted directly to the planar antenna due to heat conduction, and the heat is emitted to the outside via a number of fins, without employing a heat sink or the like.

However, in the above conventional slot antenna, the width of each slot opening is very small so as to control the amount of radiation through each slot. Therefore, air-permeability is inferior, and it is impossible to efficiently emit heat from the side walls of the waveguide. Accordingly, if the heat generated by the wireless part is large, an additional heat emitting member must be provided.

SUMMARY OF THE INVENTION

In light of the above circumstances, an object of the present invention is to provide a miniaturized radar apparatus having a superior heat emitting capability.

Therefore, the present invention provides a radar apparatus comprising:

a horn antenna part for emitting radio waves to space and receiving reflected waves with respect to the emitted radio waves from space, wherein the horn antenna part is made of a heat emitting material and includes:

an antenna body part having a plurality of horn parts arranged in an array form, wherein each horn part is open toward a front surface of the apparatus, and has a diameter which gradually increases toward the front surface; and a feeder part including a waveguide which communicates with the horn parts, wherein the feeder part is connected to the antenna body part;

a wireless part for generating a high-frequency signal supplied to the feeder part, and converting a reflected high-frequency signal to a medium-frequency signal; and a circuit part for controlling the high-frequency signal and processing the medium-frequency signal, wherein at least one of the wireless part and the circuit part is arranged in a manner such that it contacts the feeder part.

In accordance with the above structure, heat generated at the wireless part can be transmitted directly to the horn antenna part due to the heat conduction, and thus can be emitted to the outside from the antenna body part while using the surfaces of the horn parts as heat emission surfaces. In this process, the horn parts and the waveguide communicate with each other, and air is present inside thereof, so that natural convection of air can be produced inside the horn parts and the waveguide. Therefore, not only the heat conduction through the horn antenna part but also the natural convection of air contributes to transmitting heat to the horn parts and then emitting the heat from the horn parts.

In a typical example, in the feeder part, the waveguide has a horizontal path arranged between the circuit part and the horn parts, and a vertical path extending perpendicularly to the horizontal path, where the horizontal and vertical paths communicate with each other, and the vertical path is longer than the horizontal path.

Such a radar apparatus may be attached to a vehicle in a manner such that the vertical path of the waveguide, which extends perpendicularly to the horizontal path, extends substantially vertically.

In this case, when the radar apparatus is installed in a vehicle in a manner such that the horizontal and vertical paths are respectively arranged along the front-back direction and the vertical direction of the vehicle, the vertical path is longer than the horizontal path in the waveguide. Therefore, a large quantity of air passing through the waveguide can flow from the lower side to the upper side. Therefore, the natural convection of air can be generated very easily inside the waveguide, and it is possible to improve heat (or thermal) conductivity through air inside the waveguide.

In addition, air inside the horn parts is also subjected to convention due to natural convention generated inside the waveguide, thereby improving the heat emitting efficiency from the inner walls of the horn parts.

In the above typical example, preferably, a through-hole is provided between the horn parts which are arranged adjacently in a direction perpendicular to the horizontal path and the vertical path, and the through-hole extends along the vertical path.

Such a radar apparatus may be attached to a vehicle in a manner such that the through-hole along the vertical path extends substantially vertically.

In addition, a through-hole may be provided between the horn parts and the feeder part, and the through-hole may extend along a direction perpendicular to a direction defined from the circuit part toward the horn parts.

Such a radar apparatus may be attached to a vehicle in a manner such that the through-hole, which extends perpendicularly to the direction defined from the circuit part toward the horn parts, extends substantially vertically.

When such a through-hole is provided, the surface area of the through-hole can be added to the original surface area of the horn antenna part so as to increase the heat emitting surface area. In addition, air flow is also produced in the through-hole, which generates convection, thereby allowing emission of a larger amount of heat. Furthermore, the weight of the horn antenna part can be reduced by volumes excluded by the through-hole.

Preferably, the heat emitting material is a metal including aluminium or magnesium. In this case, the heat emitting material has a relatively large heat conductivity; thus, a further larger part of the heat transmitted from the wireless part or the circuit part can be emitted due to heat conduction.

Therefore, in accordance with the present invention, preferable heat emitting capability can be provided even when the apparatus is miniaturized.

DETAILED DESCRIPTION OF THE INVENTION

Hereinafter, embodiments in accordance with the present invention will be described with reference to the appended figures.

A first embodiment of the present invention will be explained with reference to FIGS. 1 to 3.

Figure 1:
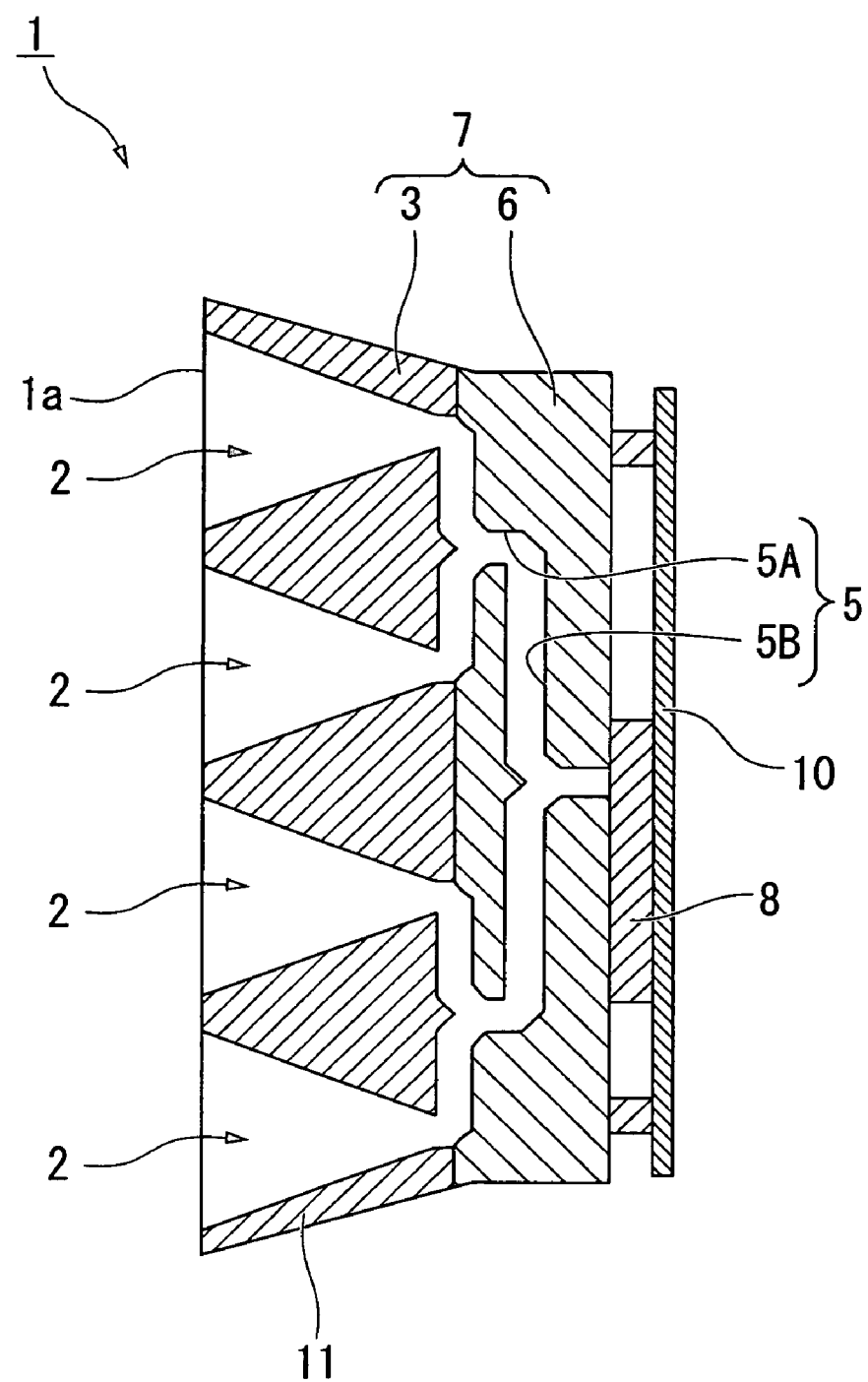
FIG. 1 is a sectional view showing a radar apparatus as a first embodiment in accordance with the present invention.
Figure 2:
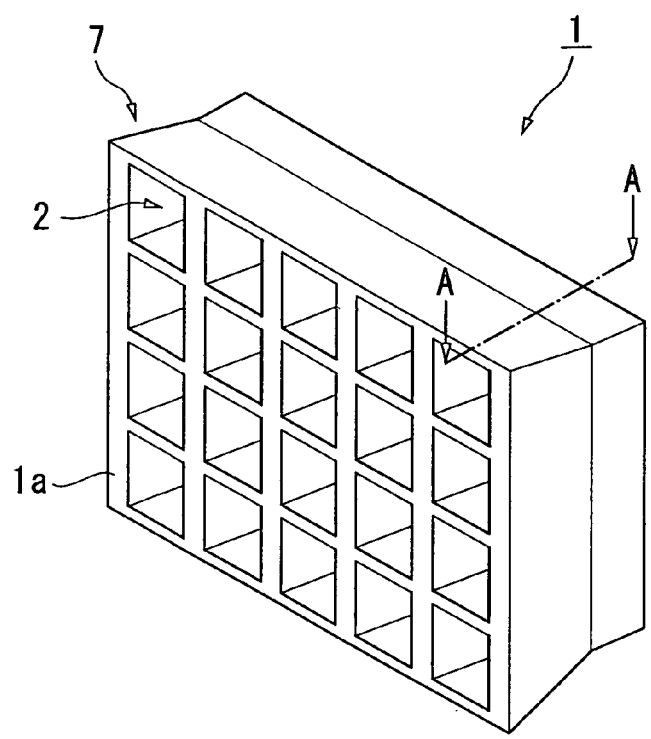
FIG. 2 is a perspective view showing the general structure of a main part of the radar apparatus in the first embodiment.
Figure 3:
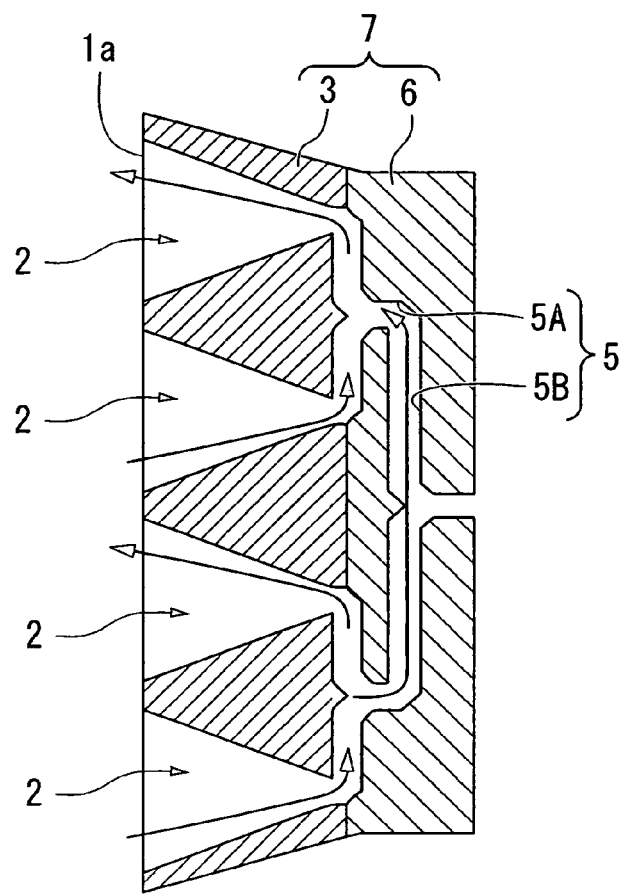
FIG. 3 is a sectional view along line A-A in FIG. 2, for explaining the heat emission state.

As shown in FIGS. 1 and 2, a radar apparatus 1 of the present embodiment is installed in a vehicle (not shown) in a manner such that its front surface 1a is directed frontward. The radar apparatus 1 has a horn antenna part 7 which includes an antenna body part 3 having horn parts 2 which are arranged in an array form, where each horn part 2 is open toward the front surface 1a, and its diameter gradually increases also toward the front surface 1a. The horn antenna part 7 also includes a feeder part 6 in which a waveguide 5 that communicates with the horn parts 2 is arranged, and which is connected to the antenna body part 3. The horn antenna part 7 emits radio waves to space, and also receives reflected waves from space with respect to the emitted waves.

This radar apparatus 1 also has a wireless part 8 for generating a high-frequency signal supplied to the feeder part 6 and converting a reflected high-frequency signal to a medium-frequency signal, and the wireless part 8 contacts the feeder part 6. In addition, a circuit part 10 is also provided for controlling the high-frequency signal and processing the medium-frequency signal, and the circuit part 10 contacts the wireless part 8. The whole body of the radar apparatus 1 is covered with a cover part 11 in a watertight manner. In this structure, the circuit part 10 may contact the feeder part 6, together with the wireless part 8.

The horn antenna part 7 is made by casting aluminium alloy, and the horn parts 2 and feeder part 6 are molded integrally, or they are integrated by fastening or joining a plurality of members. The wireless part 8 and the circuit part 10 are arranged behind the feeder part 6 in close contact.

The size, arrangement, combination, and the number of horn parts 2 of the horn antenna part 7 are determined in consideration of the use of the radar, or a required beam shape. In the present embodiment, the shape of each horn part 2 is a rectangular pyramid. When the radar apparatus is installed in the vehicle, 4×5 horn parts 2 are arranged in the antenna body part 3 in a manner such that four are arranged side by side in the vertical direction while five are arranged side by side in the horizontal direction (see FIG. 2). That is, the radar apparatus 1 has a horn antenna having four elements in the vertical direction and five elements in the horizontal direction.

The waveguide 5 has a uniform rectangular section which transmits microwaves having the basic TE10 mode but does not transmit those having higher-order modes. This waveguide 5 has horizontal paths 5A (i.e., upper, middle, lower horizontal paths in FIG. 1) which extend toward the horn parts 2 from the circuit side which includes the circuit part 10, and a vertical path 5B which extends vertically with respect to the horizontal paths 5A, so as to equalize the phase at the front surface 1a. That is, the waveguide 5 extends from the circuit side toward the front surface 1a in a fork-like form having a uniform path length, and the vertical path 5B is longer than the horizontal paths 5A.

The function and effects of the radar apparatus 1 in the present embodiment will be explained below.

In the first step, the radar apparatus 1 is installed in a vehicle (not shown) in a manner such that the front surface 1a faces the front side of the vehicle. In this process, the waveguide 5 is arranged in a manner such that the horizontal paths 5A extend along the front-back direction of the radar apparatus 1, and the vertical path 5B extends along the vertical direction of the radar apparatus 1.

When the radar apparatus 1 is operated, the wireless part 8 generates heat while it consumes electric power. Here, the wireless part 8 closely contacts the feeder part 6 of the horn antenna part 7. Therefore, the heat generated by the wireless part 8 is transmitted to the feeder part 6 due to heat conduction, and then passes through the antenna body part 3. Finally, the heat is emitted to the outside from the front surface of the antenna body part 3.

On the other hand, the heat transmitted from the wireless part 8 to the feeder part 6 is also transmitted to air inside the waveguide 5. In this process, in the waveguide 5, the quantity of air included in the vertical path 5B is larger than that in the horizontal paths 5A, and heated air moves upward through the vertical path 5B so as to produce natural convection through the waveguide 5 (see the solid arrows in FIG. 3). Accordingly, heated air is emitted from the horn parts 2 due to natural convection, thereby dissipating the heat.

In accordance with the radar apparatus 1, heat generated at the wireless part 8 can be transmitted directly to the horn antenna part 7 due to the heat conduction, and thus can be emitted to the outside from the antenna body part 3 while using the surfaces of the horn parts 2 as heat emission surfaces. In this process, the horn parts 2 and the waveguide 5 communicate with each other, so that natural convection of air can be produced inside the horn parts 2 and the waveguide 5. Therefore, not only the heat conduction through the horn antenna part 7 but also the natural convection of air contributes to emitting the heat from the horn parts 2. In addition, air inside the horn parts 2 is also subjected to convention, thereby improving the heat emitting efficiency from the inner walls of the horn parts 2.

Therefore, heat emitting capability can be improved even when the apparatus is miniaturized.

In addition, when the radar apparatus 1 is installed in the vehicle, the vertical path 5B is longer than each horizontal path 5A in the waveguide 5; thus, a large quantity of air passing through the waveguide 5 can flow from the lower side to the upper side. Therefore, the natural convection of air can be generated very easily inside the waveguide 5, and it is possible to improve heat (or thermal) conductivity through air inside the waveguide 5.

Furthermore, the horn antenna part 7 is made of aluminium alloy having a relatively large heat conductivity among metal materials; thus, a further larger part of the heat transmitted from the wireless part 8 can be emitted due to heat conduction.

Figure 4:
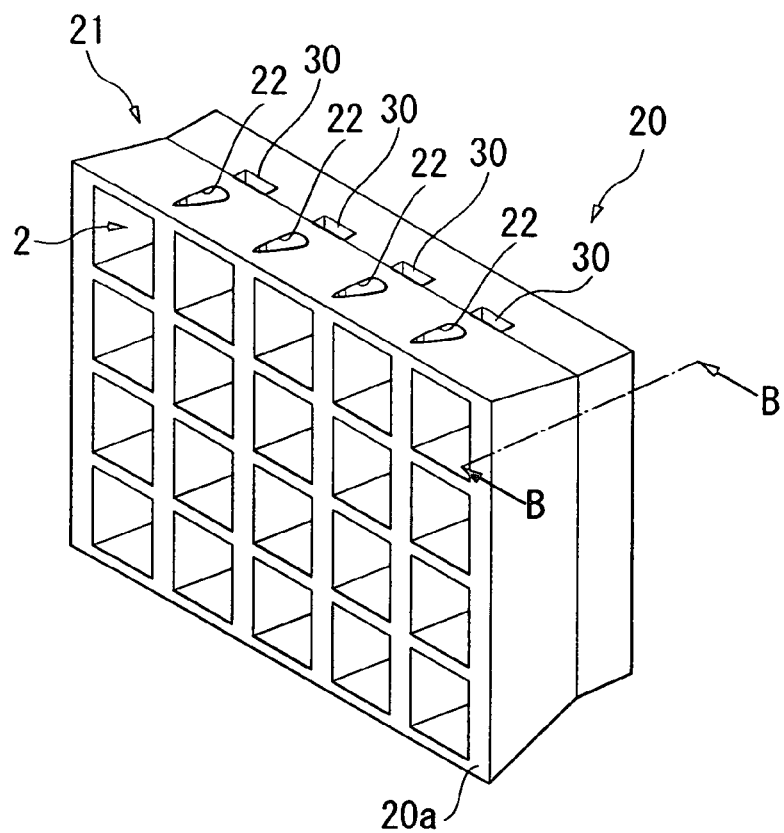
FIG. 4 is a perspective view showing the general structure of a main part of a radar apparatus as a second embodiment in accordance with the present invention.
Figure 5:
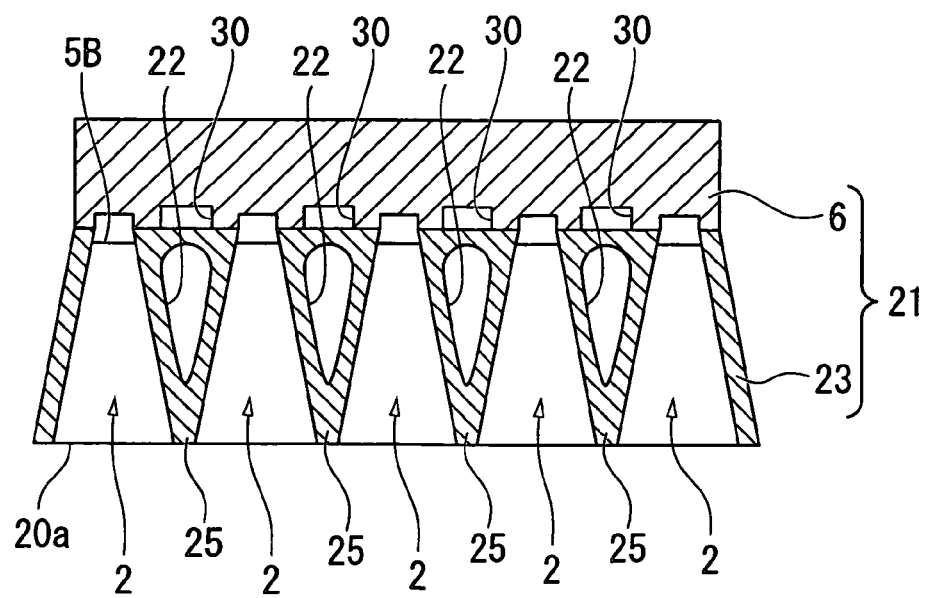
FIG. 5 is a sectional view along line B-B in FIG. 4, for explaining the shape of the through holes.

Next, a second embodiment of the present invention will be explained with reference to FIGS. 4 and 5. In these figures, parts identical to those in the above-described first embodiment are given identical reference numerals, and explanations thereof are omitted.

In comparison with the first embodiment, a radar apparatus 20 of the second embodiment has a distinctive feature of having a horn antenna part 21 in which a plurality of through-holes 22 are arranged in a direction perpendicular to the horizontal paths 5A and the vertical path 5B of the waveguide 5, that is, between the horn parts 2 which are aligned horizontally. Each through-hole 22 extends along the vertical path 5B.

Each horn part 2 has a tapered shape which is open toward its front face 20a. Therefore, in an antenna body part 23, the thickness of each partition 25, which is positioned between adjacent horn parts 2 in the horizontal direction, gradually increases from the front face 20a toward the feeder part 6, that is, in the inverse direction with respect to the horn part 2. Therefore, in top view, each through-hole 22 has a section in conformity with the form of the partition 25, that is, the side toward the front face 20a has a smaller width in comparison with the side toward the feeder part 6.

The function and effects of the radar apparatus 20 in the present embodiment will be explained below.

Similar to the first embodiment, the radar apparatus 1 is installed in a vehicle (not shown) and is operated. In this process, heat generated by the wireless part 8 is transmitted to the feeder part 6 due to heat conduction, similar to the first embodiment. The heat then passes through the antenna body part 23, and finally, it is emitted to the outside.

On the other hand, the heat transmitted to the feeder part 6 is also transmitted to air inside the waveguide 5 and the through-holes 22. In this process, in the waveguide 5, heated air moves upward through the vertical path 5B of the waveguide 5 and the through-holes 22, thereby producing natural convection. Accordingly, heated air is emitted and dissipated from the inner wall surfaces of the antenna body part 23 due to heat conduction through natural convection.

In accordance with the radar apparatus 20, functions and effects similar to those obtained by the first embodiment can be obtained.

In particular, as the through-holes 22 are provided vertically in the horn antenna part 21, the surface areas of the through-holes 22 can be added to the original surface area of the horn antenna part 21 so as to increase the heat emitting surface area. In addition, air flow is also produced in each through-hole 22, which generates convection, thereby allowing emission of a larger amount of heat. Furthermore, the weight of the horn antenna part 21 can be reduced by volumes excluded by the through-holes 22.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

For example, in the above-described second embodiment, the through-holes 22 formed in the vertical direction cause an increase in the surface area of the horn antenna part 21. In addition to that, additional holes for connecting the through-holes 22 in the horizontal direction may be formed. In another variation, ribs may be formed in the through-holes 22 so as to further increase the surface area.

Also in the above second embodiment, the through-holes 22 are arranged between the horn parts 2 in the horizontal direction. However, this is not a limited form, and the through-holes may extend from the horn parts 2 to the feeder part 6, that is, may be arranged between the horn parts 2 and the feeder part 6 (such through-holes 30 are also shown in FIGS. 4 and 5).

In addition, the shape of each through-hole 22 is not limited to that in conformity to the shape of the horn parts 2, and may be circular. Furthermore, each through-hole 22 may be divided into a plurality of smaller through-holes.

What is claimed is:

1. A radar apparatus comprising:
   a horn antenna part for emitting radio waves to space and receiving reflected waves with respect to the emitted radio waves from space, wherein the horn antenna part is made of a heat emitting material and includes:
      an antenna body part having a plurality of horn parts arranged in an array form, wherein each horn part is open toward a front surface of the apparatus, and has a diameter which gradually increases toward the front surface; and
      a feeder part including a waveguide which communicates with the horn parts, wherein the feeder part is connected to the antenna body part;
   a wireless part for generating a high-frequency signal supplied to the feeder part, and converting a reflected high-frequency signal to a medium-frequency signal; and
   a circuit part for controlling the high-frequency signal and processing the medium-frequency signal,
   wherein at least one of the wireless part and the circuit part is arranged in a manner such that it contacts the feeder part.

2. The radar apparatus in accordance with claim 1, wherein in the feeder part, the waveguide has a horizontal path arranged between the circuit part and the horn parts, and a vertical path extending perpendicularly to the horizontal path, where the horizontal and vertical paths communicate with each other, and the vertical path is longer than the horizontal path.

3. The radar apparatus in accordance with claim 2, which is attached to a vehicle in a manner such that the vertical path of the waveguide, which extends perpendicularly to the horizontal path, extends substantially vertically.

4. The radar apparatus in accordance with claim 2, wherein a through-hole is provided between the horn parts which are arranged adjacently in a direction perpendicular to the horizontal path and the vertical path, and the through-hole extends along the vertical path.

5. The radar apparatus in accordance with claim 4, which is attached to a vehicle in a manner such that the through-hole along the vertical path extends substantially vertically.

6. The radar apparatus in accordance with claim 1, wherein a through-hole is provided between the horn parts and the feeder part, and the through-hole extends along a direction perpendicular to a direction defined from the circuit part toward the horn parts.

7. The radar apparatus in accordance with claim 6, which is attached to a vehicle in a manner such that the through-hole, which extends perpendicularly to the direction defined from the circuit part toward the horn parts, extends substantially vertically.

8. The radar apparatus in accordance with claim 1, wherein the heat emitting material is a metal including aluminium or magnesium.

* * * * *